(12) United States Patent
Yang et al.

(10) Patent No.: US 10,630,517 B2
(45) Date of Patent: Apr. 21, 2020

(54) METHOD AND APPARATUS FOR MULTI-TRP AND MULTI-PANEL TRANSMISSION IN WIRELESS COMMUNICATIONS

(71) Applicant: MediaTek Inc., Hsinchu (TW)

(72) Inventors: Weidong Yang, San Diego, CA (US); Lung-Sheng Tsai, Hsinchu (TW); Bo-Si Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/129,775

(22) Filed: Sep. 12, 2018

(65) Prior Publication Data

US 2019/0081750 A1    Mar. 14, 2019

Related U.S. Application Data

(60) Provisional application No. 62/557,194, filed on Sep. 12, 2017.

(51) Int. Cl.
| | |
|---|---|
| H04L 27/26 | (2006.01) |
| H04L 5/00 | (2006.01) |
| H04B 17/12 | (2015.01) |
| H04B 17/21 | (2015.01) |
| H04B 17/00 | (2015.01) |

(Continued)

(52) U.S. Cl.
CPC .......... *H04L 27/2611* (2013.01); *H04B 7/024* (2013.01); *H04B 7/0626* (2013.01); *H04B 17/0085* (2013.01); *H04B 17/12* (2015.01); *H04B 17/21* (2015.01); *H04B 17/318* (2015.01); *H04B 17/345* (2015.01); *H04L 1/1812* (2013.01); *H04L 5/0035* (2013.01); *H04L 5/0046* (2013.01); *H04L 5/0048* (2013.01); *H04L 5/0082* (2013.01); *H04L 5/0091* (2013.01); *H04L 27/2613* (2013.01); *H04L 27/2665* (2013.01); *H04L 5/0023* (2013.01)

(58) Field of Classification Search
CPC combination set(s) only.
See application file for complete search history.

(56) References Cited

U.S. PATENT DOCUMENTS

| | | | |
|---|---|---|---|
| 2019/0044666 A1* | 2/2019 | Li | H04L 1/1861 |
| 2019/0045489 A1* | 2/2019 | He | H04W 72/042 |

FOREIGN PATENT DOCUMENTS

| | | |
|---|---|---|
| WO | WO 2017126920 A1 | 7/2017 |
| WO | WO 2017136666 A1 | 8/2017 |

OTHER PUBLICATIONS

3GPP673, May 2017, (On Multi-TRP and Multi-panel transmission, R1-1708673).*

(Continued)

*Primary Examiner* — Lakeram Jangbahadur
(74) *Attorney, Agent, or Firm* — Han IP PLLC; Andy M. Han

(57) ABSTRACT

Various solutions with respect to multi-transmission and receiving points (TRP) and multi-panel transmission in wireless communications are described. A processor of a user equipment (UE) associated with a single media access control (MAC) entity receives signaling from a plurality of network nodes of a wireless network. The processor generates at least one feedback responsive to receiving the signaling. The processor transmits the at least one feedback to at least one network node of the plurality of network nodes.

16 Claims, 5 Drawing Sheets

(51) Int. Cl.
H04B 17/318 (2015.01)
H04B 17/345 (2015.01)
H04B 7/024 (2017.01)
H04B 7/06 (2006.01)
H04L 1/18 (2006.01)

(56) References Cited

OTHER PUBLICATIONS

State Intellectual Property Office, International Search Report and Written Opinion for International Patent Application No. PCT/CN2018/105317, dated Nov. 28, 2018.
Ericsson, Multi-TRP Transmission, 3GPP TSG RAN WG1 Meeting #88, Athens, Greece, Feb. 13-17, 2017.
Ericsson, On Multi-TRP and Multi-panel transmission, 3GPP TSG RAN WG1 #89, Hangzhou, China, May 15-19, 2017.

\* cited by examiner

500

```
┌─────────────────────────────────────────────────────────────┐
│  RECEIVE, BY A PROCESSOR OF A USER EQUIPMENT (UE), SIGNALING FROM A │
│         PLURALITY OF NETWORK NODES OF A WIRELESS NETWORK    │
│                           510                               │
│                                                             │
│   ┌─────────────────────────────────────────────────────┐   │
│   │  RECEIVE A CONTROL SIGNAL VIA A PLURALITY OF PHYSICAL DOWNLINK │
│   │  CONTROL CHANNELS (PDCCHS) FROM THE PLURALITY OF NETWORK │
│   │                        NODES                        │   │
│   │                         512                         │   │
│   └─────────────────────────────────────────────────────┘   │
│                            │                                │
│                            ▼                                │
│   ┌─────────────────────────────────────────────────────┐   │
│   │  RECEIVE DATA VIA ONE OR MORE PHYSICAL DOWNLINK SHARED CHANNELS │
│   │  (PDSCHS) FROM ONE OR MORE NETWORK NODES OF THE PLURALITY OF │
│   │                    NETWORK NODES                    │   │
│   │                         514                         │   │
│   └─────────────────────────────────────────────────────┘   │
└─────────────────────────────────────────────────────────────┘
                             │
                             ▼
┌─────────────────────────────────────────────────────────────┐
│   GENERATE, BY THE PROCESSOR, AT LEAST ONE FEEDBACK RESPONSIVE TO │
│                    RECEIVING THE SIGNALING                  │
│                           520                               │
└─────────────────────────────────────────────────────────────┘
                             │
                             ▼
┌─────────────────────────────────────────────────────────────┐
│  TRANSMIT, BY THE PROCESSOR, THE AT LEAST ONE FEEDBACK TO AT LEAST ONE │
│          NETWORK NODE OF THE PLURALITY OF NETWORK NODES     │
│                           530                               │
└─────────────────────────────────────────────────────────────┘
```

FIG. 5

METHOD AND APPARATUS FOR MULTI-TRP AND MULTI-PANEL TRANSMISSION IN WIRELESS COMMUNICATIONS

CROSS REFERENCE TO RELATED PATENT APPLICATION(S)

The present disclosure is part of a non-provisional application claiming the priority benefit of U.S. Patent Application No. 62/557,194, filed on 12 Sep. 2017, the content of which is incorporated by reference in its entirety.

TECHNICAL FIELD

The present disclosure is generally related to wireless communications and, more particularly, to multi-transmission and receiving points (TRP) and multi-panel transmission in wireless communications.

BACKGROUND

Unless otherwise indicated herein, approaches described in this section are not prior art to the claims listed below and are not admitted as prior art by inclusion in this section.

In $5^{th}$ Generation (5G) or New Radio (NR) mobile communications, to make Coordinated Multi-Point (CoMP) scheme more useful, it is important to allow dynamic switching between single transmit-and-receive point (TRP) and multi-TRP transmissions.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions, schemes, methods and apparatus that enable multi-TRP and multi-panel transmission in wireless communications. It is believed that the proposed solutions, schemes, methods and apparatus would boost control channel reliability, enhance data channel robustness, and/or improve data throughput via network multiple-input-and-multiple-output (MIMO).

In one aspect, a method may involve a processor of a user equipment (UE) associated with a single media access control (MAC) entity receiving signaling from a plurality of network nodes of a wireless network. The method may also involve the processor generating at least one feedback responsive to receiving the signaling. The method may further involve the processor transmitting the at least one feedback to at least one network node of the plurality of network nodes.

In one aspect, an apparatus may include a transceiver capable of wireless receiving and transmission as well as a processor coupled to the transceiver. The processor may be associated with a single MAC entity and may be capable of: (1) receiving, via the transceiver, a control signal via a plurality of physical downlink control channels (PDCCHs) from a plurality of network nodes of a wireless network; (2) receiving, via the transceiver, data via one or more physical downlink shared channels (PDSCHs) from one or more network nodes of the plurality of network nodes; (3) generating at least one feedback responsive to receiving the signaling; and (4) transmitting, via the transceiver, the at least one feedback to at least one network node of the plurality of network nodes.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies wherever applicable such as, for example and without limitation, Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

DETAILED DESCRIPTION OF PREFERRED IMPLEMENTATIONS

Figure 1:
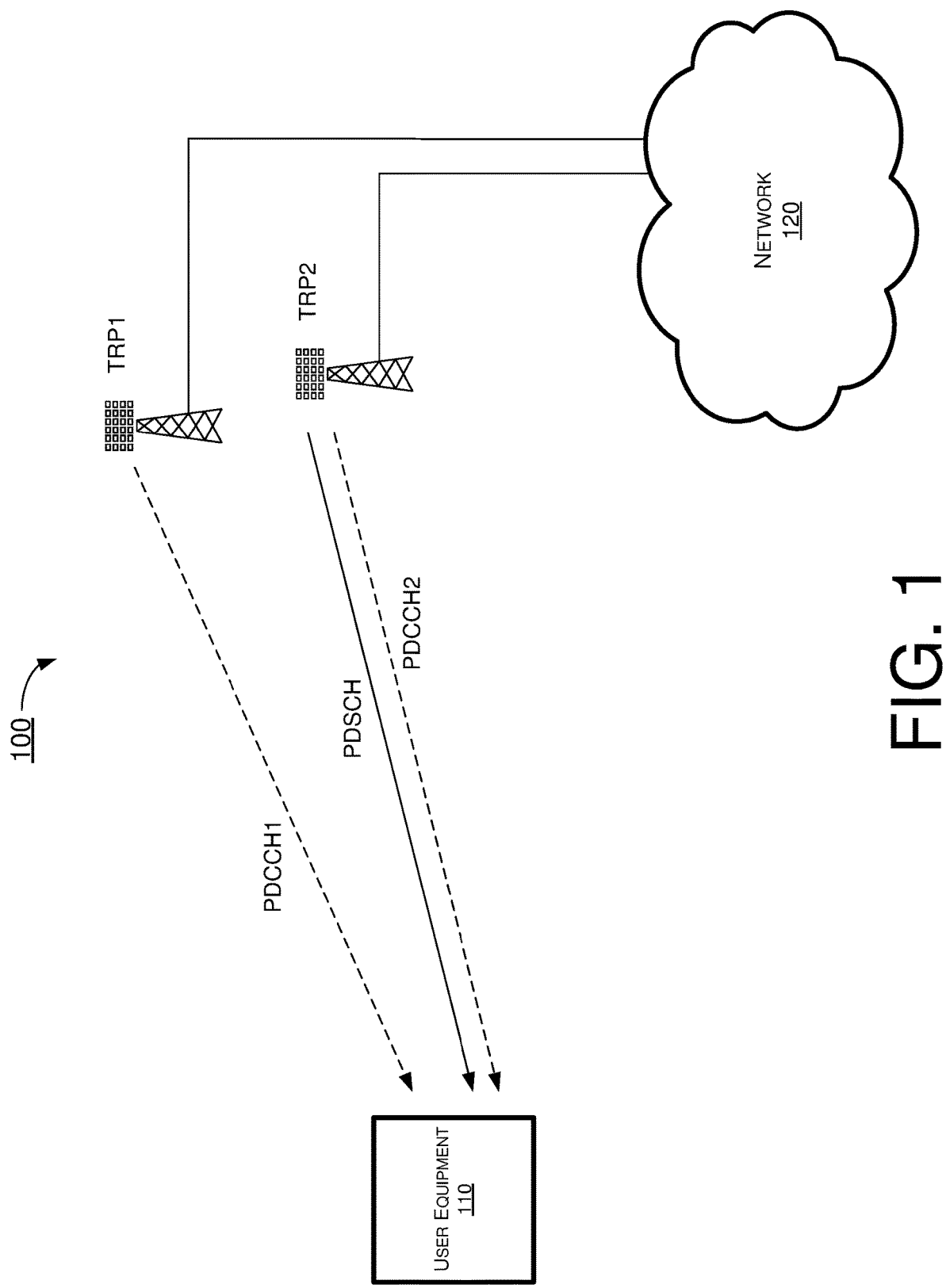
FIG. 1 is a diagram depicting an example scenario in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to uplink partial sub-frame transmission with respect to user equipment and network apparatus in wireless communications. According to the present disclosure, a number of possible solutions may be implemented separately or jointly. That is, although these possible solutions may be described below separately, two or more of these possible solutions may be implemented in one combination or another.

Single-PDCCH Case

Under a proposed scheme in accordance with the present disclosure, there may be two options to support data transmission from two TRPs scheduled by a single PDCCH. Under a first option, data transmission from a first TRP may stay on a set of spatial layers, and data transmission from a second TRP may stay on another set of spatial layers. Under a second option, data transmission from two TRPs may follow an order of resource element (RE) mapping as follows: spatial layer→frequency→time. In this case, the spatial layers may come from both TRPs.

With the second option, the quasi-colocation (QCL) assumptions for different spatial layers and demodulation reference signal (DMRS) mapping may need to be differentiated according to TRPs, with other transmission parameters remaining the same. It may be possible that the rule concerning the number of spatial layers and the number of codewords for a single TRP case may be applied to simultaneous transmissions from two TRPs. For instance, with two-layer transmissions from a first TRP (TRP1) and one-layer transmission from a second TRP (TRP2), then a three-layer transmission from TRP1 and TRP2 may be used for a single codeword. In this case, the QCL assumption under one codeword may need to be signaled to the UE.

Under the proposed scheme, one solution may be to follow the design in Further Enhanced CoMP (FeCoMP). In the case of two TRP transmissions, two codewords may be assumed and the QCL assumption may be tied to each codeword, and all the DMRS ports for each codeword may have the same QCL assumption. In other words, all the spatial layers under one codeword may come from one TRP. It is noteworthy that, depending on the channel state information (CSI) feedback from a UE, the transmission rank for one TRP may vary from 1 to 4 in this case. Hence, rank combinations for two codewords (i, j) for 1≤i, j≤4 may be supported, and rank indication for each codeword may be supported from that.

With the flexibility of rank combination for two codewords from two TRPs, the same downlink control information (DCI) design may need to support both multi-TRP transmission and single-TRP transmission. Thus, it may be a natural progression to allow flexibility for two-codeword transmissions for the single-TRP case. For instance, for single-TRP transmissions, rank combinations for two codewords (i, j) for 1≤i, j≤4 may be supported.

To avoid complications in CSI feedback for either the single-TRP case or the multi-TRP case, given a certain rank, the base station (e.g., gNB) may indicate a set of allowed combinations. For instance, with four layers, the combination {(2, 2) (for two codewords), (4) (for a single codeword)} may be examined to avoid excessive complexity in CSI acquisition.

To avoid excessive complexity in UE blind detection, single PDCCH scheduling for two codewords from two TRPs may be monitored on a single control resource set (CORESET) with one TRP, and a single QCL assumption may be assumed for such PDCCH. It is noteworthy that, for ultra-reliable low-latency communication (URLLC), the consideration may be different and whether a PDCCH scheduling for two codewords from two TRPs may be transmitted from either of the two TRPs may be further studied.

Two-PDCCH Case

The two-PDCCH cases was originally motivated by consideration on non-ideal backhaul between TRPs. In 5G/NR wireless communications, up to four layers may be used in a transmission for a single transport block. In an event that a base station (e.g., gNB) schedules a four-layer transmission from two TRPs to a UE at the same time, then the UE may receive data for eight spatial layers. Accordingly, restricting two codewords over the scheduled NR-PDSCHs may not constitute much of a constraint.

When two separate media access control (MAC) entities exist for the UE for corresponding TRPs, scheduling and feedback design may follow the dual connectivity (DuCo) framework. That is, hybrid automatic repeat request acknowledgement (HARQ-Ack) may be sent separately to avoid gNB communications through non-ideal backhaul. As the HARQ process identification (ID) space may be defined separately for each TRP, there is no need to increase the maximum HARQ process number.

Under a proposed scheme in accordance with the present disclosure, when a single MAC entity (e.g., MAC address) is used for the UE/TRPs, separate PDCCH transmissions may provide the signaling for the same or different data. To aid better appreciation of the proposed scheme, a number of use cases or illustrative examples are provided below.

In a first example, two PDCCHs may point to a single PDSCH transmission, with the two PDCCHs having identical scheduling information except for necessary adaptation according to QCL assumptions. Strictly speaking, further agreement may be necessary to enable two PDCCHs to point to the same PDSCH. In this case, two PDCCHs may be used to boost the reliability for the control channel. Moreover, the HARQ ID space may not need to be increased.

In a second example, two PDCCHs may point to two PDSCH transmissions for the same data, with the same HARQ process ID and with the same or different redundant version(s). This may contribute to a more robust data channel. Moreover, the HARQ ID space may not need to be increased.

In a third example, two PDCCHs may point to two different PDSCHs, with different HARQ process IDs. This may provide a boosted data throughput via network MIMO. Assuming that, over ideal backhaul, the network is allowed to use two PDCCHs to schedule two PDSCHs, then HARQ-Ack feedback from the UE may be sent to one TRP (e.g., the TRP with a better uplink quality in the physical uplink control channel (PUCCH) group). In this case, for different data transmissions from different TRPs, increasing the HARQ-Ack ID space may be one solution to re-use the HARQ scheduling and feedback scheme for a single TRP.

Alternatively, a second TRP may be numbered in a similar fashion as in carrier aggregation (CA). For instance, given a UE configured with two carrier frequencies, a first TRP (TRP1) and a second TRP (TRP2) may transmit to the UE on a first carrier frequency (F1) while a third TRP (TRP3) and a fourth TRP (TRP4) may transmit to the UE on a second carrier frequency (F2) to configure the UE. Accordingly, for CSI feedback and HARQ feedback, TRP1~TRP4 may be treated as if they are four component carriers. That is, different channels may be re-indexed. For instance, a virtual component carrier ID may be utilized to specify or otherwise identify a TRP/carrier frequency order in the feedback, with carrier frequency index first or co-channel TRP first. Moreover, any HARQ-Ack aggregation application to CA in the uplink feedback may be applied to the PDSCHs scheduled by two PDCCHs. One difference lies in whether the same frequency or different carrier frequencies are used.

Illustrative Scenarios

FIG. 1 illustrates an example scenario 100 in accordance with implementations of the present disclosure. Scenario 100 may be an illustrative implementation of at least part of the first example and second example under the two-PDCCH case as described above. Referring to FIG. 1, scenario 100 may involve a UE 110 and multiple network nodes (e.g., TRPs) such as TRP1 and TRP2 associated with a wireless network 120 (e.g., a 5G/NR mobile network).

In scenario 100, network node TRP1 may transmit a first control signal via a first PDCCH (denoted as "PDCCH1" in FIG. 1) to UE 110, and network node TRP2 may transmit a second control signal via a second PDCCH (denoted as "PDCCH2" in FIG. 1) to UE 110. Both the first control signal transmitted via PDCCH1 and the second control signal transmitted via PDCCH2 may point to a single PDSCH (denoted as "PDSCH" in FIG. 1). In this example, the PDSCH may be utilized by network node TRP2 to transmit data to UE 110. In response, UE 110 may provide feedback to network node TRP1 and network node TRP2 by transmitting a single HARQ-Ack with a single HARQ process ID. Advantageously, this may boost control channel reliability.

Alternatively, the first control signal transmitted via PDCCH1 and the second control signal transmitted via PDCCH2 may point to two different PDSCHs (not shown), with one of the two PDSCHs utilized by network node TRP1 to transmit data to UE 110 and the other of the two PDSCHs utilized by network node TRP2 to transmit the same data to UE 110. In this case, the same HARQ process ID with the same redundancy version or different redundancy versions may be utilized. In response, UE 110 may provide feedback to network node TRP1 and network node TRP2 by transmitting a single HARQ-Ack with a single HARQ process ID. Advantageously, this may enhance data channel robustness.

Figure 2:
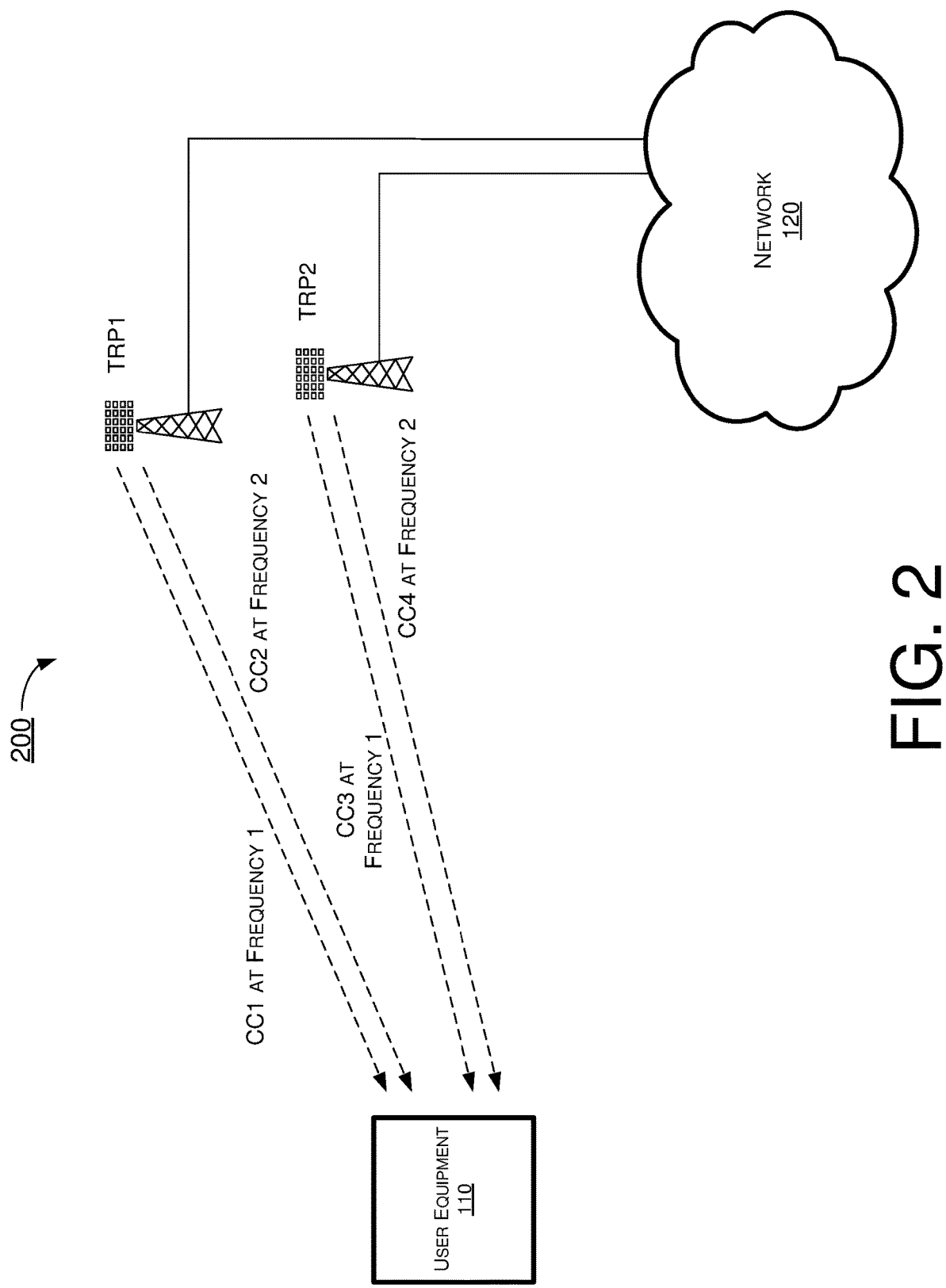
FIG. 2 is a diagram depicting an example scenario in accordance with implementations of the present disclosure.

FIG. 2 illustrates an example scenario 200 in accordance with implementations of the present disclosure. Scenario 200 may be an illustrative implementation of at least part of the third example under the two-PDCCH case as described above. Referring to FIG. 2, scenario 200 may involve a UE 110 and multiple network nodes (e.g., TRPs) such as TRP1 and TRP2 associated with a wireless network 120 (e.g., a 5G/NR mobile network).

In scenario 200, network node TRP1 may transmit a first control signal via a first PDCCH in a first component carrier and a second component carrier (denoted as "CC1" and "CC2" in FIG. 2, respectively) to UE 110, and network node TRP2 may transmit a second control signal via a second PDCCH in a third component carrier and a fourth component carrier (denoted as "CC3" and "CC4" in FIG. 2, respectively) to UE 110. Both the first control signal transmitted via the first PDCCH and the second control signal transmitted via the second PDCCH may point to two different PDSCHs, with one of the two PDSCHs utilized by network node TRP1 to transmit data to UE 110 and the other of the two PDSCHs utilized by network node TRP2 to transmit the same data to UE 110. In case of an ideal backhaul, UE 110 may transmit a single HARQ-Ack to one of TRP1 and TRP2, whichever one that has a better uplink quality in the PUCCH group. In response, UE 110 may provide feedback to network node TRP1 and network node TRP2 by transmitting two HARQ-Ack's each with a respective HARQ process ID.

In scenario 200, UE 110 may be configured with or otherwise capable of communicating in different carrier frequencies. Network node TRP1 may transmit CC1 at a first frequency (denoted as "frequency 1" in FIG. 2) and CC2 at a second frequency (denoted as "frequency 2" in FIG. 2). Similarly, network node TRP2 may transmit CC3 at the first frequency and CC4 at the second frequency. In response, UE 110 may provide feedback to network node TRP1 and network node TRP2 by transmitting a respective feedback for each of CC1, CC2, CC3 and CC4 with the respective feedback having a respective component carrier ID for the respective component carrier.

Figure 3:
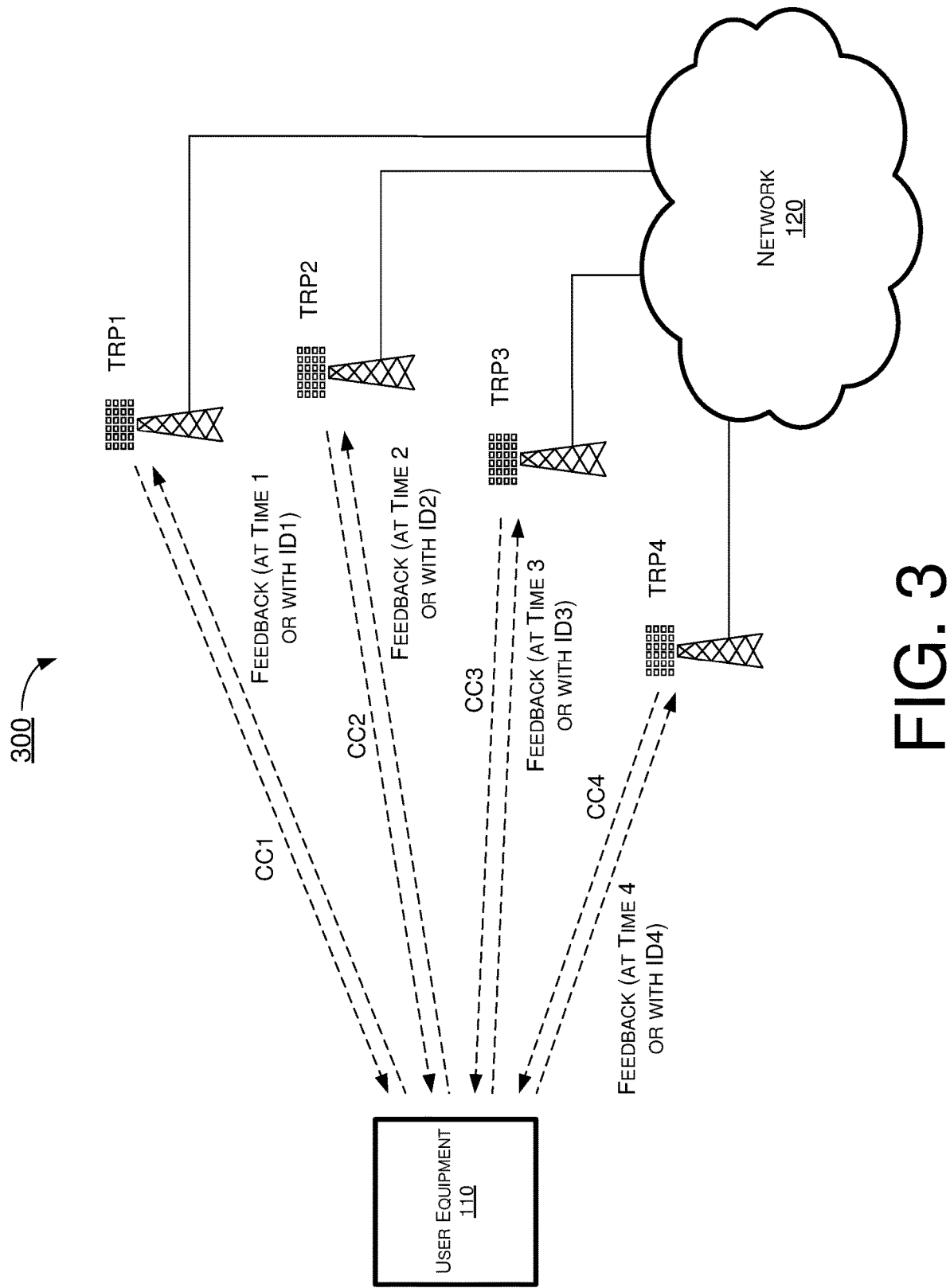
FIG. 3 is a diagram depicting an example scenario in accordance with implementations of the present disclosure.

FIG. 3 illustrates an example scenario 300 in accordance with implementations of the present disclosure. Scenario 300 may be an illustrative implementation of at least part of the third example under the two-PDCCH case as described above. Referring to FIG. 3, scenario 300 may involve a UE 110 and multiple network nodes (e.g., TRPs) such as TRP1, TRP2, TRP3 and TRP4 associated with a wireless network 120 (e.g., a 5G/NR mobile network).

In scenario 300, UE 110 may transmit a first feedback to a first subset (one or more) of network nodes TRP1, TRP2, TRP3 and TRP4 from which a given control signal is received in a given CC and then transmit a second feedback to a second subset (one or more) of network nodes TRP1, TRP2, TRP3 and TRP4 from which another control signal is received in another CC. Alternatively, UE 110 may transmit a first feedback to a first subset (one or more) of network nodes TRP1, TRP2, TRP3 and TRP4 from which a given control signal is received via a given PDCCH and then transmit a second feedback to a second subset (one or more) of network nodes TRP1, TRP2, TRP3 and TRP4 from which another control signal is received via another PDCCH.

In the example shown in FIG. 3, network node TRP1 may transmit a first control signal via a first PDCCH in a first component carrier (denoted as "CC1" in FIG. 3) to UE 110, network node TRP2 may transmit a second control signal via a second PDCCH in a second component carrier (denoted as "CC2" in FIG. 3) to UE 110, network node TRP3 may transmit a third control signal via a third PDCCH in a third component carrier (denoted as "CC3" in FIG. 3) to UE 110, and network node TRP4 may transmit a fourth control signal via a fourth PDCCH in a fourth component carrier (denoted as "CC4" in FIG. 3) to UE 110. The first, second, third and fourth control signals transmitted to UE 110 may point to a single PDSCH or different PDSCHs. In response, UE 110 may provide feedback to network nodes TRP1, TRP2, TRP3 and TRP4 by transmitting feedbacks (e.g., HARQ-Ack's or CSI feedbacks) in a predefined order.

For instance, UE 110 may transmit a feedback to TRP1 at a first point in time (denoted as "time 1" in FIG. 3), a feedback to TRP2 at a second point in time (denoted as "time 2" in FIG. 3), a feedback to TRP3 at a third point in time (denoted as "time 3" in FIG. 3), and a feedback to TRP4 at a fourth point in time (denoted as "time 4" in FIG. 3). Alternatively, as UE 110 may be configured with or otherwise capable of communicating in different carrier frequencies, UE 110 may transmit a feedback to TRP1 at a first frequency (denoted as "frequency 1" in FIG. 3), a feedback to TRP2 at a second frequency (denoted as "frequency 2" in FIG. 3), a feedback to TRP3 at a third frequency (denoted as "frequency 3" in FIG. 3), and a feedback to TRP4 at a fourth frequency (denoted as "frequency 4" in FIG. 3).

Alternatively, as TRPs as shown in FIG. 3 are given tags such as CC1, CC2, CC3, CC4, the HARQ-Ack feedback design for carrier aggregation in NR is reused for multi-TRP transmission. That is, under a proposed scheme in accordance with the present disclosure, TRPs at different carrier frequencies are assigned virtual component carrier IDs such as CC1/ . . . /CC4 and their respective HARQ-Acks are encoded accordingly as if they were for component carriers in one PUCCH group.

Illustrative Implementations

Figure 4:
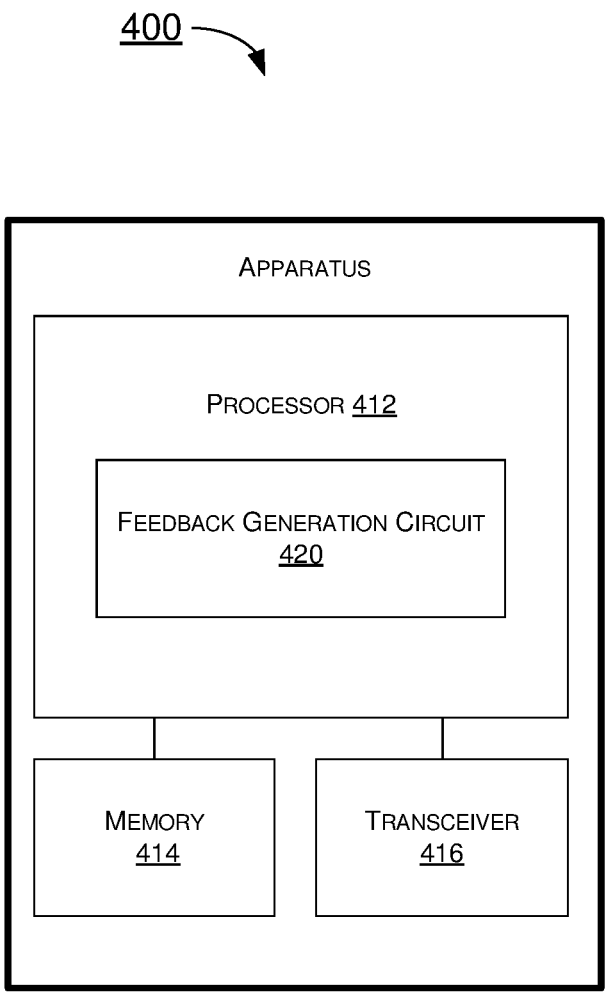
FIG. 4 is a block diagram of an example apparatus in accordance with an implementation of the present disclosure.

FIG. 4 illustrates an example apparatus 400 in accordance with an implementation of the present disclosure. Apparatus 400 may be an example implementation of UE 110 in scenarios 100, 200 and 300, and apparatus 400 may perform various functions to implement schemes, techniques, processes and methods described herein pertaining to multi-TRP and multi-panel transmission in wireless communications, including scenarios 100, 200 and 300 described above as well as process 500 described below.

Apparatus 400 may be a part of an electronic apparatus, which may be a UE such as a portable or mobile apparatus, a wearable apparatus, a wireless communication apparatus or a computing apparatus. For instance, apparatus 400 may be implemented in a smartphone, a smartwatch, a personal digital assistant, a digital camera, or a computing equipment such as a tablet computer, a laptop computer or a notebook computer. In some cases, apparatus 400 may also be a part of a machine type apparatus, which may be an IoT or NB-IoT apparatus such as an immobile or a stationary apparatus, a home apparatus, a wire communication apparatus or a computing apparatus. For instance, apparatus 400 may be implemented in a smart thermostat, a smart fridge, a smart door lock, a wireless speaker or a home control center. Alternatively, apparatus 400 may be implemented in the form of one or more integrated-circuit (IC) chips such as, for example and without limitation, one or more single-core processors, one or more multi-core processors, or one or more complex-instruction-set-computing (CISC) processors. Apparatus 400 may include at least some of those components shown in FIG. 4 such as a processor 412, for example. Apparatus 400 may further include one or more other components not pertinent to the proposed scheme of the present disclosure (e.g., internal power supply, display device and/or user interface device), and, thus, such component(s) of apparatus 400 are neither shown in FIG. 4 nor described below in the interest of simplicity and brevity.

In one aspect, processor 412 may be implemented in the form of one or more single-core processors, one or more multi-core processors, or one or more CISC processors. That is, even though a singular term "a processor" is used herein to refer to processor 412, processor 412 may include multiple processors in some implementations and a single processor in other implementations in accordance with the present disclosure. In another aspect, processor 412 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 412 is a special-purpose machine specifically designed, arranged and configured to perform specific tasks including multi-TRP and multi-panel transmission in accordance with various implementations of the present disclosure.

In some implementations, apparatus 400 may also include a transceiver 416 coupled to processor 412 and capable of wirelessly transmitting and receiving data, information and various signaling. In some implementations, apparatus 400 may further include a memory 414 coupled to processor 412 and capable of being accessed by processor 412 and storing data therein.

To aid better understanding, the following description of the operations, functionalities and capabilities of apparatus 400 is provided in the context of scenario 100, scenario 200 and/or scenario 300 in which apparatus 400 is implemented in or as UE 110.

Under a proposed scheme in accordance with the present disclosure, processor 412 of apparatus 400, which may be associated with a single MAC entity (e.g., MAC address), may receive signaling, via transceiver 416, from a plurality of network nodes (e.g., two or more of TRP1, TRP2, TRP3 and TRP4) of a wireless network (e.g., a 5G/NR mobile network). Additionally, a feedback generation circuit 420 in processor 412 may generate at least one feedback responsive to receiving the signaling. Moreover, processor 412 may transmit, via transceiver 416, the at least one feedback to at least one network node of the plurality of network nodes.

In some implementations, in receiving the signaling from the plurality of network nodes, processor 412 may receive a control signal via a plurality of PDCCHs from the plurality of network nodes. Additionally, processor 412 may receive data via one or more PDSCHs from one or more network nodes of the plurality of network nodes.

In some implementations, in receiving the control signal via the plurality of PDCCHs from the plurality of network nodes, processor 412 may receive, via transceiver 416 at a plurality of frequencies, a plurality of component carriers (CCs) configured for apparatus 400.

In some implementations, in transmitting the at least one feedback, processor 412 may transmit a feedback for each of a respective CC of the plurality of CCs with the feedback having a respective CC identification for the respective CC.

In some implementations, in receiving the control signal via the plurality of PDCCHs from the plurality of network nodes, processor 412 may receive, via transceiver 416, at least in a first CC and a second CC via at least a first PDCCH and a second PDCCH from the plurality of network nodes. Moreover, in transmitting the at least one feedback, processor 412 may transmit a plurality of feedbacks in a predefined order.

In some implementations, in transmitting the plurality of feedbacks in the predefined order, processor 412 may first transmit a first feedback of the plurality of feedbacks to a first subset of network nodes of the plurality of network nodes from which the control signal is received in the first CC. Additionally, processor 412 may subsequently transmit a second feedback of the plurality of feedbacks to a second subset of network nodes of the plurality of network nodes from which the control signal is received in the second CC.

In some implementations, in transmitting the plurality of feedbacks in the predefined order, processor 412 may order feedback bits according to a CC-first-and-network-node-second fashion.

In some implementations, in transmitting the plurality of feedbacks in the predefined order, processor 412 may order feedback bits according to a network-node-first-and-CC-second fashion.

Alternatively, in transmitting the plurality of feedbacks in the predefined order, processor 412 may first transmit a first feedback of the plurality of feedbacks to a first subset of network nodes of the plurality of network nodes from which the control signal is received via the first PDCCH. Moreover, processor 412 may subsequently transmit a second feedback of the plurality of feedbacks to a subset group of network nodes of the plurality of network nodes from which control signal is received via the second PDCCH.

In some implementations, in receiving the data via one or more PDSCHs from one or more network nodes of the plurality of network nodes, processor 412 may receive the data via multiple PDSCHs. Additionally, in transmitting the at least one feedback, processor 412 may transmit a plurality of HARQ acknowledgements each having a respective HARQ process ID.

In some implementations, in receiving the data via one or more PDSCHs from one or more network nodes of the plurality of network nodes, processor 412 may receive the data via multiple PDSCHs. Moreover, in transmitting the at least one feedback, processor 412 may transmit a single HARQ acknowledgement with a single HARQ process ID.

In some implementations, in receiving the data via one or more PDSCHs from one or more network nodes of the plurality of network nodes, processor 412 may receive the data via a single PDSCH. Additionally, in transmitting the at least one feedback, processor 412 may transmit a single HARQ acknowledgement with a single HARQ process ID.

In some implementations, the plurality of network nodes may include a plurality of TRPs of a 5G/NR mobile network.

In some implementations, the at least one feedback may include at least one HARQ acknowledgement or at least one CSI feedback.

In some implementations, processor 412 may assign a virtual component carrier ID to each of a plurality of network nodes (e.g., TRPs), such as CC1, CC2, CC3 and CC4 for four TPRs for example, and the respective HARQ-Ack transmitted by processor 412 to each of the network nodes may be encoded accordingly as if the feedbacks were for component carriers in one PUCCH group.

Illustrative Processes

FIG. 5 illustrates an example process 500 in accordance with an implementation of the present disclosure. Process 500 may be an example implementation of scenario 100, scenario 200, scenario 300, or a combination thereof, whether partially or completely, with respect to multi-TRP and multi-panel transmission in wireless communications in accordance with the present disclosure. Process 500 may represent an aspect of implementation of features of communication apparatus 400. Process 500 may include one or more operations, actions, or functions as illustrated by one or more of blocks 510, 520 and 530 as well as sub-blocks 512 and 514. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order, and one or more of the blocks of process 500 may be repeated one or more times. Process 500 may be implemented by communication apparatus 400 or any suitable UE or machine type devices. Solely for illustrative purposes and without limitation, process 500 is described below in the context of communication apparatus 400 as a UE. Process 500 may begin at block 510.

At 510, process 500 may involve processor 412 of apparatus 400, which may be associated with a single MAC entity (e.g., MAC address), receiving signaling, via transceiver 416, from a plurality of network nodes of a wireless network (e.g., a 5G/NR mobile network). Process 500 may proceed from 510 to 520.

At 520, process 500 may involve processor 412 generating at least one feedback responsive to receiving the signaling. Process 500 may proceed from 520 to 530.

At 530, process 500 may involve processor 412 transmitting, via transceiver 416, the at least one feedback to at least one network node of the plurality of network nodes.

In some implementations, in receiving the signaling from the plurality of network nodes, process 500 may involve processor 412 performing a number of operations as represented by sub-blocks 512 and 514.

At 512, process 500 may involve processor 412 receiving a control signal via a plurality of PDCCHs from the plurality of network nodes. Process 500 may proceed from 512 to 514.

At 514, process 500 may involve processor 412 receiving data via one or more PDSCHs from one or more network nodes of the plurality of network nodes.

In some implementations, in receiving the control signal via the plurality of PDCCHs from the plurality of network nodes, process 500 may involve processor 412 receiving, at a plurality of frequencies, a plurality of component carriers (CCs) configured for apparatus 400.

In some implementations, in transmitting the at least one feedback, process 500 may involve processor 412 transmitting a feedback for each of a respective CC of the plurality of CCs with the feedback having a respective CC identification for the respective CC.

In some implementations, in receiving the control signal via the plurality of PDCCHs from the plurality of network nodes, process 500 may involve processor 412 receiving at least in a first CC and a second CC via at least a first PDCCH and a second PDCCH from the plurality of network nodes. Moreover, in transmitting the at least one feedback, process 500 may involve processor 412 transmitting a plurality of feedbacks in a predefined order.

In some implementations, in transmitting the plurality of feedbacks in the predefined order, process 500 may involve processor 412 ordering feedback bits according to a CC-first-and-network-node-second fashion.

In some implementations, in transmitting the plurality of feedbacks in the predefined order, process 500 may involve processor 412 ordering feedback bits according to a network-node-first-and-CC-second fashion.

Alternatively, in transmitting the plurality of feedbacks in the predefined order, process 500 may involve processor 412 first transmitting a first feedback of the plurality of feedbacks to a first subset of network nodes of the plurality of network nodes from which the control signal is received via the first PDCCH. Moreover, process 500 may involve processor 412 subsequently transmitting a second feedback of the plurality of feedbacks to a subset group of network nodes of the plurality of network nodes from which the control signal is received via the second PDCCH.

In some implementations, in receiving the data via one or more PDSCHs from one or more network nodes of the plurality of network nodes, process 500 may involve processor 412 receiving the data via multiple PDSCHs. Additionally, in transmitting the at least one feedback, process 500 may involve processor 412 transmitting a plurality of HARQ acknowledgements each having a respective HARQ process ID.

In some implementations, in receiving the data via one or more PDSCHs from one or more network nodes of the plurality of network nodes, process 500 may involve processor 412 receiving the data via multiple PDSCHs. Moreover, in transmitting the at least one feedback, process 500 may involve processor 412 transmitting a single HARQ acknowledgement with a single HARQ process ID.

In some implementations, in receiving the data via one or more PDSCHs from one or more network nodes of the plurality of network nodes, process 500 may involve processor 412 receiving the data via a single PDSCH. Additionally, in transmitting the at least one feedback, process 500 may involve processor 412 transmitting a single HARQ acknowledgement with a single HARQ process ID.

In some implementations, the plurality of network nodes may include a plurality of TRPs of a 5G/NR mobile network.

In some implementations, the at least one feedback may include at least one HARQ acknowledgement or at least one CSI feedback.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  receiving, by a processor of a user equipment (UE), signaling from a plurality of network nodes of a wireless network by:
    receiving a control signal via a plurality of physical downlink control channels (PDCCHs) from the plurality of network nodes; and
    receiving data via one or more physical downlink shared channels (PDCCHs) from one or more network nodes of the plurality of network nodes;
  generating, by the processor, at least one feedback responsive to receiving the signaling; and
  transmitting, by the processor, the at least one feedback to at least one network node of the plurality of network nodes,
  wherein the receiving of the control signal via the plurality of PDCCHs from the plurality of network nodes comprises receiving at least a first PDCCH and a second PDCCH from the plurality of network nodes,
  wherein the transmitting of the at least one feedback comprises transmitting a plurality of feedbacks in a predefined order, and
  wherein the transmitting of the plurality of feedbacks in the predefined order comprises:
    transmitting a first feedback of the plurality of feedbacks to a first subset of network nodes of the plurality of network nodes from which the control signal is received via the first PDCCH; and
    transmitting a second feedback of the plurality of feedbacks to a subset group of network nodes of the plurality of network nodes from which the control signal is received via the second PDCCH.

2. The method of claim 1, wherein the receiving of the control signal via the plurality of PDCCHs from the plurality of network nodes comprises receiving, at a plurality of frequencies, a plurality of CCs configured for the UE.

3. The method of claim 2, wherein the transmitting of the at least one feedback comprises transmitting a feedback for each of a respective CC of the plurality of CCs with the feedback having a respective CC identification for the respective CC.

4. The method of claim 1, wherein the receiving of the control signal via the plurality of PDCCHs from the plurality of network nodes comprises receiving at least in a first component carrier (CC) and a second CC for at least the first PDCCH and the second PDCCH from the plurality of network nodes.

5. The method of claim 4, wherein the transmitting of the plurality of feedbacks in the predefined order comprises:
ordering the feedback bits according to CC first and network node second fashion 6a. The method of claim 4, wherein the transmitting of the plurality of feedbacks in the predefined order comprises: ordering the feedback bits according to network node first and CC second fashion.

6. The method of claim 1, wherein the receiving of the data via one or more PDSCHs from one or more network nodes of the plurality of network nodes comprises receiving the data via multiple PDSCHs, and wherein the transmitting of the at least one feedback comprises transmitting a plurality of hybrid automatic repeat request (HARQ) acknowledgements each having a respective HARQ process identification (ID).

7. The method of claim 1, wherein the receiving of the data via one or more PDSCHs from one or more network nodes of the plurality of network nodes comprises receiving the data via multiple PDSCHs, and wherein the transmitting of the at least one feedback comprises transmitting a single hybrid automatic repeat request (HARQ) acknowledgement with a single HARQ process identification (ID).

8. The method of claim 1, wherein the receiving of the data via one or more PDSCHs from one or more network nodes of the plurality of network nodes comprises receiving the data via a single PDSCH, and wherein the transmitting of the at least one feedback comprises transmitting a single hybrid automatic repeat request (HARQ) acknowledgement with a single HARQ process identification (ID).

9. The method of claim 1, wherein the plurality of network nodes comprise a plurality of transmit-and-receive points (TRPs) of a New Radio (NR) mobile network.

10. The method of claim 1, wherein the at least one feedback comprises at least one hybrid automatic repeat request (HARQ) acknowledgement or at least one channel state information (CSI) feedback.

11. An apparatus, comprising:
a transceiver capable of wireless receiving and transmission; and
a processor coupled to the transceiver, the processor associated with a single media access control (MAC) entity and configured to perform operations comprising:
receiving, via the transceiver, a control signal via a plurality of physical downlink control channels (PDCCHs) from a plurality of network nodes of a wireless network;
receiving, via the transceiver, data via one or more physical downlink shared channels (PDSCHs) from one or more network nodes of the plurality of network nodes;
generating at least one feedback responsive to receiving the signaling; and
transmitting, via the transceiver, the at least one feedback to at least one network node of the plurality of network nodes,
wherein, in receiving the control signal via the plurality of PDCCHs from the plurality of network nodes, the processor receives at least a first PDCCH and a second PDCCH from the plurality of network nodes, and
wherein, in transmitting the at least one feedback, the processor transmits a plurality of feedbacks in a predefined order by:
transmitting a first feedback of the plurality of feedbacks to a first subset of network nodes of the plurality of network nodes from which the control signal is received via the first PDCCH; and
transmitting a second feedback of the plurality of feedbacks to a subset group of network nodes of the plurality of network nodes from which the control signal is received via the second PDCCH.

12. The apparatus of claim 11, wherein, in receiving the control signal via the plurality of PDCCHs from the plurality of network nodes, the processor receives, at a plurality of frequencies, a plurality of component carriers (CCs) that configure the UE.

13. The apparatus of claim 12, wherein, in transmitting the at least one feedback, the processor transmits a feedback for each of a respective CC of the plurality of CCs with the feedback having a respective CC identification for the respective CC.

14. The apparatus of claim 11, wherein, in transmitting the plurality of feedbacks in the predefined order, the processor is further configured to perform operations comprising:
first transmitting a first feedback of the plurality of feedbacks to a first subset of network nodes of the plurality of network nodes from which the control signal is received in the first CC; and
subsequently transmitting a second feedback of the plurality of feedbacks to a second subset of network nodes of the plurality of network nodes from which the control signal is received in the second CC.

15. The apparatus of claim 11, wherein, in receiving the data via one or more PDSCHs from one or more network nodes of the plurality of network nodes, the processor further receives the data via a single PDSCH, and wherein, in transmitting the at least one feedback, the processor transmits a single hybrid automatic repeat request (HARQ) acknowledgement with a single HARQ process identification (ID).

16. The apparatus of claim 11, wherein the plurality of network nodes comprise a plurality of transmit-and-receive points (TRPs) of a New Radio (NR) mobile network, and wherein the at least one feedback comprises at least one hybrid automatic repeat request (HARQ) acknowledgement or at least one channel state information (CSI) feedback.

* * * * *